United States Patent [19]
George

[11] Patent Number: 6,065,021
[45] Date of Patent: May 16, 2000

[54] APPARATUS AND METHOD FOR ALIGNMENT OF GRAPHICAL ELEMENTS IN ELECTRONIC DOCUMENT

[75] Inventor: Paul A. George, Los Altos, Calif.

[73] Assignee: Adobe Systems Incorporated, San Jose, Calif.

[21] Appl. No.: 09/056,469

[22] Filed: Apr. 7, 1998

[51] Int. Cl.[7] .................................................. G06F 17/50
[52] U.S. Cl. ..................................... 707/502; 364/474.34
[58] Field of Search ..................................... 707/502, 530; 345/433, 441; 364/468.03, 468.04, 167.03, 474.22, 474.24, 474.34

[56] References Cited

U.S. PATENT DOCUMENTS

| | | | |
|---|---|---|---|
| 5,444,836 | 8/1995 | Hollingsworth et al. | 345/435 |
| 5,463,722 | 10/1995 | Venolia | 345/433 |
| 5,572,639 | 11/1996 | Gantt | 345/433 |
| 5,636,132 | 6/1997 | Kamdar | 395/500.03 |
| 5,754,826 | 5/1998 | Gamal et al. | 395/500.35 |
| 5,873,106 | 2/1999 | Joseph | 707/506 |
| 5,988,862 | 11/1999 | Kacyra et al. | 364/578 |

*Primary Examiner*—Stephen S. Hong
*Attorney, Agent, or Firm*—Fish & Richardson P.C.

[57] ABSTRACT

A computer-implemented method for aligning objects includes receiving a current cursor position, receiving task information and receiving a set of alignments each having an associated priority. The method also includes screening the set of alignments based on task information and a predetermined set of priority factors, determining a highest priority alignment, and outputting a new cursor position corresponding to the highest priority alignment if such an alignment exists.

12 Claims, 8 Drawing Sheets

APPARATUS AND METHOD FOR ALIGNMENT OF GRAPHICAL ELEMENTS IN ELECTRONIC DOCUMENT

BACKGROUND OF THE INVENTION

The invention relates generally to methods and apparatus for rapid alignment of graphical elements in electronic documents.

In graphics applications (computer programs) it is often difficult and time consuming to align objects to one another in an electronic document. Examples of graphics applications are illustration and page layout programs. Artists often require precise relationships among objects. Typically, a user must either "eyeball" the object position or draw some form of guide object in order to achieve alignment. The former approach is prone to error and the latter is time consuming.

SUMMARY OF THE INVENTION

The invention can be implemented in numerous ways, including as a system, a method, or as a computer program stored in computer-readable medium.

As a computer-implemented method for aligning objects, an implementation of the invention includes receiving a current cursor position, receiving task information and receiving a set of alignments each having an associated priority. The method also includes screening the set of alignments based on the task information and a predetermined set of priority factors, determining a highest priority alignment and outputting a new cursor position corresponding to the highest priority alignment if such an alignment exists.

As a system for aligning an object, an implementation of the invention includes a computer system for executing computer code to produce, and displaying an electronic document having an object therein. The system also includes a display device for displaying the electronic document and a computer readable storage medium for storing the computer code. The computer code includes computer instructions for receiving a current cursor position, computer instructions for receiving task information and computer instructions for receiving a set of alignments each having an associated priority. The computer code also includes computer instructions for screening the set of alignments based on the task information and a predetermined set of priority factors, computer instructions for determining a highest priority alignment and computer instructions for outputting a new cursor position corresponding to the highest priority alignment if such an alignment exists.

As a computer readable medium containing program instructions for aligning an object, an implementation of the invention includes computer readable code for causing a computer to execute instructions in accordance with the methods disclosed herein.

In one or more implementations of the invention, the set of alignments may include at least one of the following: boundary alignments, required alignments, custom tool alignments, construction line alignments, grid line alignments, page boundary alignments and graphical object alignments. Determining a minimum priority and eliminating alignments having a priority less than the minimum priority during the screening of the set of alignments may be included. The outputting of a new cursor position may include an annotation describing the highest priority alignment.

The present invention has mechanisms which support boundary alignment and required alignments. Smart guides can be used in any object based design application where it is desirable to align objects. Other aspects and advantages of the invention will become apparent from the following detailed description, taken in conjunction with the accompanying drawing, illustrating by way of example the principles of the invention.

DETAILED DESCRIPTION

Figure 1A:
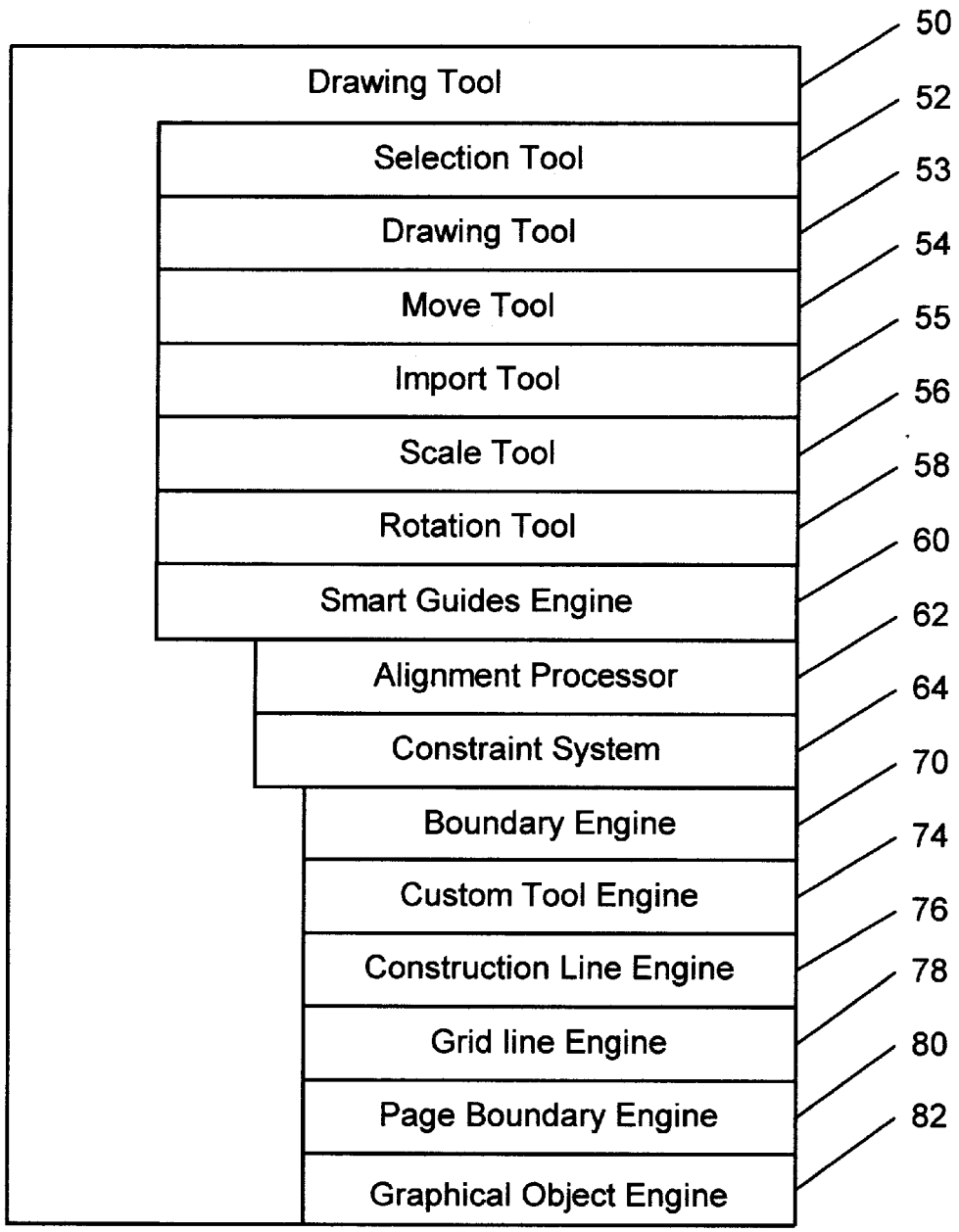
FIG. 1*a* is block diagram of RAM including a drawing application in accordance with the invention.

As illustrated in FIG. 1*a*, a drawing application 50 may include numerous tools for selecting, manipulating, and otherwise transforming objects in an electronic document. Examples of tools include a selection tool 52, drawing tool 53, a move tool 54, import tool 55, scale tool 56 and a rotation tool 58.

Selection tool 52 typically operates in conjunction with a mouse or other pointing device to indicate an object to be operated on by other tools in the drawing application.

Drawing tool 53 may be used to draw objects in the electronic document. The drawing tool may include methods for applying brush strokes, patterns, shapes and other predefined features to an electronic document. The drawing tool may include a pen tool, which may be used to draw lines and curves.

Move tool 54 also typically operates in conjunction with a mouse or pointing device and receives as an input a selection of an object to be moved, a new location for an object to be moved and may receive path information for traversing the object between its origination point and the new location. A drag and drop mechanism is an example of a move tool. A drag and drop mechanism typically includes methods for selecting an object (responsive to a selection through a mouse), moving the object (responsive to holding down a mouse button) and dropping the object at the new location (responsive to releasing the mouse button). The drag and drop mechanism includes methods for indicating that an object has been selected, methods for displaying the object at the new location and may include methods for displaying an intermediate form of the object as it traverses along the path from the origination point to the new location.

Import tool 55 may be used to import graphics, text, images or other objects from hard disk 28, ROM 18 or from another computer through network interface 30. Scale tool 56 may be used to scale an object and provides a transformation of the object which is calculated to maintain the aspect ratio of the object(s) being scaled. Rotation tool 58 may be used to rotate objects in the electronic document.

It is often desirable to align objects to other elements in an electronic document. When enabled, a smart guides engine 60 automatically provides alignments to other elements in a electronic document in response to transformations or manipulations caused by the use of a tool.

Smart guides engine 60 may be invoked by a tool executing in the application. When invoked, smart guides engine 60 receives cursor position information and monitors the activities of the tool executing in the application, waiting for a manipulation or other transformation of an object which may require alignment. Smart guides engine 60 includes an alignment processor 62 and a constraint system 64. The alignment processor and constraint system are described in more detail below.

Alignment processor 62 calculates a new cursor position satisfying a highest priority alignment from the information provided by the tool, e.g., cursor position and task information, and information provided by the constraint system, e.g., a set of possible alignments, based on a predetermined set of priority factors.

The inputs to the alignment processor are a control string, a search radius and the current cursor position. A minimum priority for the resulting alignment and a keyboard modifier status information may also be provided as an input.

Figure 1B:
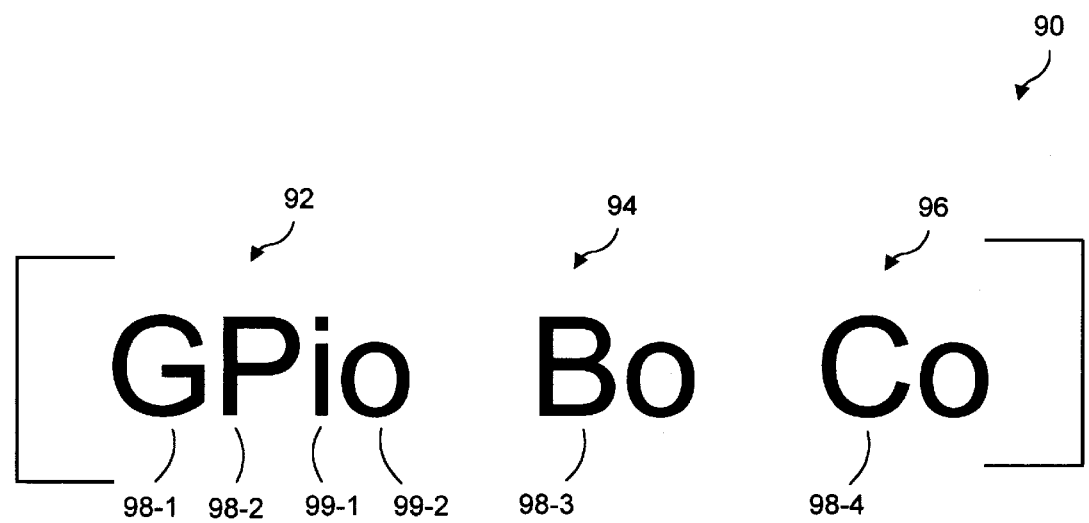
FIG. 1*b* is a schematic block diagram of a control string in accordance with the invention.

The control string defines those types of alignments that should be considered and an ordering of the alignment types. The set of possible alignments is tool dependent and a specific control string is associated with each tool. In one implementation, the control string is of the form of a series of groups, with each group including one or more types of alignments. Types of alignments include boundary, custom tool, construction line, grid line, page boundary and graphical object alignments. In the implementation each alignment type corresponds to a unique engine in the constraint system. The type information may be further refined to include format information relating to the format of the particular alignment type requested. In the following example, three distinct formats are selectable including alignment to single points, alignment to single lines or curves or alignment to the intersection of two or more lines or curves. An example of a control string is shown in FIG. 1b.

Control string 90 includes groups 92, 94 and 96. First group 92 includes two alignment types 98-1 and 98-2, while group 94 and 96 include only one alignment type 98-3 and 98-4, respectively. The alignment type is designated by a single upper case letter (where the letter B=boundary alignment, T=custom tool alignment, C=construction line alignment, G=grid line alignment, P=page boundary alignment and O=graphical object alignment). Group 92 further includes format information 99-1 and 99-2. The format information is designated by a single lower case letter (where the letter p=single point alignment, o=single line or curve alignment and i=alignment to the intersection of two or more lines or curves).

In operation, the smart guides engine operates on control string 90 searching for alignments of the type specified by the type information which are in accordance with the designated format. For example, when processing group 92, the smart guide engine searches for grid line alignments and page boundary alignments and would return a candidate alignment when an alignment involving intersections of two or more grid lines or page boundary lines is detected (responsive to the "i" format). In addition, the smart guide engine searches for single grid line alignments and page boundary alignments and returns a candidate alignment if one is detected (responsive to the "O" format). The processing of control strings is discussed in detail below in reference to FIG. 7.

Referring again to FIG. 1a, each alignment type within a group is of the same priority. Alignment processor 62 evaluates individual alignments returned to determine a best alignment as is discussed in greater detail below. Each group in the control string is processed in order. If no alignments are returned by the constraint system based on the alignment type(s) (as designated by the particular group of the control string and format information) and search radius information provided, then a next group in the string is processed.

The search radius defines the radius from the current search position for considering candidate alignments. The search radius may be a default value or may be set by a user.

The current cursor position input returns a selected position on the object being transformed by the current tool. The current cursor position is typically of the form of an (x,y) coordinate specified by a pointing device operated in accordance with the execution of the current tool. The current cursor position may be of the form of a single point, a series of points or a curve.

In one implementation, the state of keyboard modifiers is also provided as an input to alignment processor 62. Keyboard modifiers such as the shift key may be used to activate required alignments associated with a current tool. Required alignments are discussed in greater detail below in association with the custom tool engine.

Constraint system 64 includes a set of processes (engines), each of which is capable of selectively furnishing possible alignments to alignment processor 62. In one implementation, constraint system 64 includes the following processes: boundary engine 70, custom tool engine 74, construction line engine 76, grid line engine 78, page boundary engine 80 and graphical object engine 82. Each process may be separately enabled or disabled. Each individual process monitors various conditions and provides particular types of alignments. The types of alignments associated with the engines identified above include boundary alignments, custom tool alignments including required alignments, construction line alignments, grid line alignments, page boundary alignments and graphical object alignments, respectively.

The inputs to constraint system 64 include type information, an input cursor position and a search radius. The type information includes a request (from the alignment processor) for the kinds of alignments to return and form of alignment to be returned (point or edge alignment). In addition, the state of any keyboard modifiers of interest may also be provided as an input to the constraint system. The constraint system provides as an output a list of candidate alignments.

Typically an alignment is considered to be a candidate if the alignment point lies within the search radius of the input cursor position. Certain alignments, referred to as required alignments, ignore search radius and are always considered as candidates. Required alignments are described in greater detail below in association with the custom tool engine.

The list returned by the constraint system consists of a sequence of pairs of the form of (address, point) or (address, curve) depending on whether point or edge alignments were requested. The address provides information about the candidate alignment including the priority of the alignment. A point is specified as an (x,y) coordinate pair. A curve may be specified by any parametric curve, such as a cubic Bezier curves.

Priority for alignments may be invoked using three distinct mechanisms. First, the priority of particular types of alignments may be set based on the control string groupings. The predefined control string includes the order in which alignments are sought by the alignment processor.

A second mechanism for realizing priorities is by setting an individual priority level for each alignment at the engine level. Alignments are stored at the engine level as a combination of geometry information, e.g. a point of curve, and may include a predefined priority setting. The priority level may be stored as an integer specifying the quality of a proposed alignment. A value of 0 indicates the alignment has the lowest priority while higher values indicate more preferable alignments. The alignment processor uses the priority factors, in conjunction with the cursor position, to determine a highest priority alignment, or set of highest priority alignments, from the set of possible alignments provided by the constraint system.

A third mechanism for realizing priorities is through the designation of required alignments. A required alignment is tool specific alignment that when invoked is considered as a candidate alignment irrespective of the search radius designated. Required alignments are discussed in greater detail below.

Constraint system 64 obtains the list of possible alignments by requesting each enabled engine (process) for a list of its alignments. In order to calculate a set of possible alignments for the alignment processor, the constraint system provides each enabled engine with the type of request and the distance requirement (search radius) received from the alignment processor. The enabled engines selectively provide a list of all of the possible alignments for a given type of request and distance requirement. Following is a brief description of the constraint engines and how each obtains its respective alignments.

Figure 2:
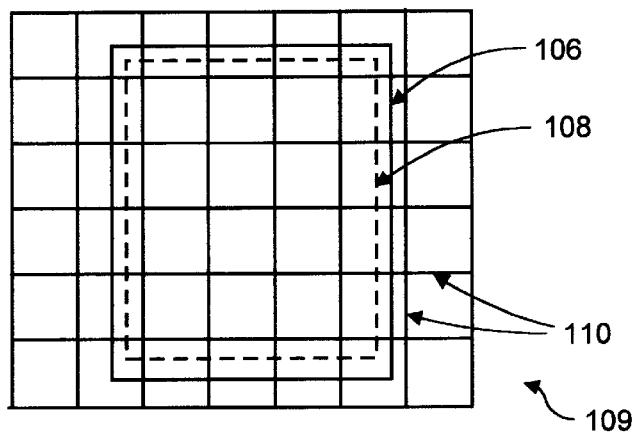
FIG. 2 shows grid lines, page boundaries and an imageable page area of a page as displayed on an output device according to the invention.

Referring to FIG. 2, page boundaries 106 are defined by the edges of the page on which the document is to be printed and define the boundary of the imageable part of the page 108. Page boundary engine 80 (FIG. 1a) supports aligning objects to the printable area of the paper. The page boundary engine receives as inputs radius information and the current cursor location and produces as an output a list of all possible alignments to the page boundaries of the electronic document, which may be of the form of points or curves.

Figure 3:
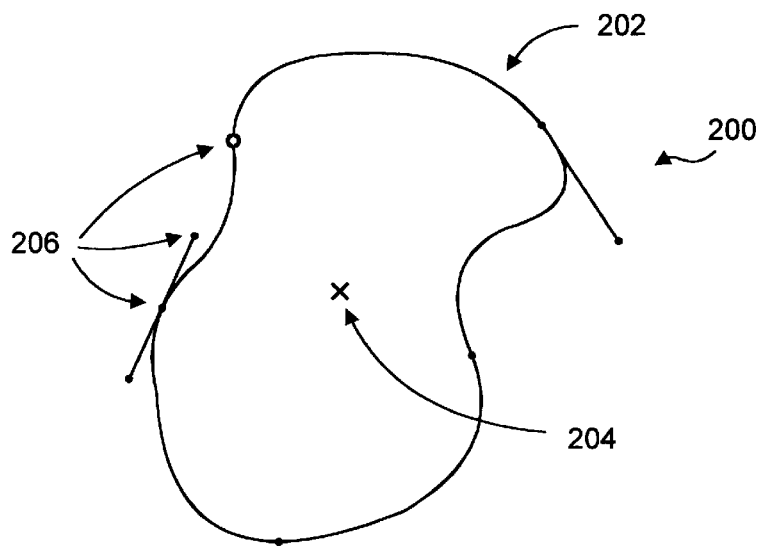
FIG. 3 shows an object having a center, edges and control handles as displayed on an output device according to the invention.

Referring to FIG. 3, graphical object engine 82 (FIG. 1a) supports snapping the cursor, which typically designates a point on an object 200, to the edge 202 of object 200 existing in the electronic document. The graphical object engine receives as inputs radius information and current cursor location. The graphical object engine produces as an output a list of all possible alignments to other objects in the electronic document and an alignment point (or curve) for the proposed alignment. The shape of an object is defined by a sequence of curves, such as cubic Bezier curves, together with control handles which manipulate those curves.

Graphical object engine 82 (FIG. 1a) determines all candidate edges and points for alignment by querying the underlying application to locate those objects which are within the given distance of the present location of the cursor. Candidate points for alignment may be determined based on the object geometry as well as the particular location on the object being transformed. For example, if the center 204 of an object is selected, and the object is then moved, the center of the object may be evaluated by graphical object engine 82 (FIG. 1a) for alignment to other objects, and in particular to the centers of other objects within the electronic document. Objects within the radius are then inspected to identify the edges 202 and control handles 206 which are within the radius to which the object may be aligned.

Referring back to FIG. 2, the application may include tools for defining a grid 109 of horizontal and vertical lines 110 for application to a electronic document similar to graph paper. As with graph paper, the lines may be other than horizontal and vertical while still producing a grid. Grid line engine 78 (FIG. 1a) determines the position of each such grid line and evaluates the grid lines as candidates for alignment. Grid line engine 78 (FIG. 1a) receives as inputs radius information and the current cursor location. The grid line engine produces as an output a list of all possible alignments to the grid lines of the electronic document and an alignment point (or curve) for the proposed alignment.

Figure 4:
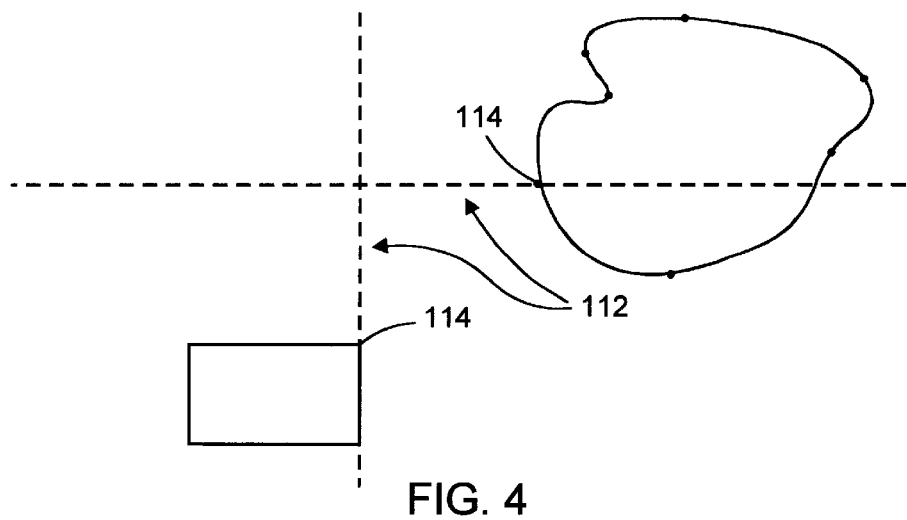
FIG. 4 shows multiple objects and construction lines as displayed on an output device according to the invention.

Referring to FIG. 4, construction lines 112 are lines which are automatically generated at an arbitrary (or user defined) angle through a given point 114. Construction lines are generated by the smart guides engine as the cursor moves over the document. Each time a cursor snaps to a point on an object, a construction line is drawn through it. The angles of the construction lines are specified by a user through an interface supplied by the application. The set of points through which construction lines are drawn may be kept in a first in first out (FIFO) buffer of a default or user defined maximum size. When a set of lines through a new point is added to the list, the length of the list may be inspected. If the length exceeds the maximum, the oldest entry in the list is discarded. This behavior prevents too many construction lines from being active at one time. A default length of the list is approximately 8. Construction line engine 76 (FIG. 1a) evaluates each construction line in the list of construction lines to determine suitable alignments. Construction line engine 76 (FIG. 1a) receives as inputs radius information, current cursor location and the list of construction lines. The construction line engine produces as an output a list of all possible alignments to the construction lines of the electronic document which are described by an alignment point (or curve) for the proposed alignment.

Figure 5:
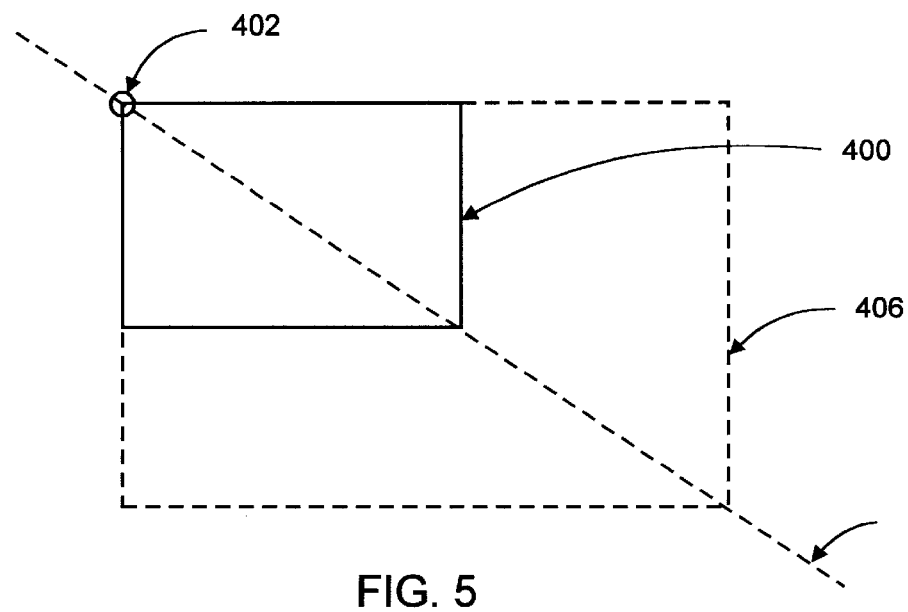
FIG. 5 shows custom tool alignments as displayed on an output device according to the invention.

Referring to FIG. 5, custom tool alignments are specified by the application based on the current active tool. The custom tool alignments are appropriate to the tool being used to manipulate a given object. Custom tool alignments may be specified as a list of points and angles at which lines may be constructed through those points. The list may also or alternatively include a list of curves. For example, use of the scale tool may result in a custom alignment of an object 400 based on a line 404 drawn through an origin point 402 which is used to preserve the aspect ratio of the scaling of the object from its original size to new size at location 406. Custom tool engine 74 (FIG. 1a) receives as inputs radius information, current cursor location and the list of custom lines (curves). The custom tool engine produces as an output a list of all possible alignments to the custom lines (curves) of the electronic document which are described by an alignment point (or curve) for the proposed alignment.

Optionally, ones of the custom tool alignments may be designated required alignments. A required alignment is a tool-specific alignment having the highest priority. The drawing application may make use of various mechanisms to activate a required alignment. For example, the shift key is often used in a graphic application to force an object to move horizontally or vertically. Accordingly, when a move tool is invoked in conjunction with the shift key in these kind of systems, a required or inferred alignment may be activated.

In one implementation, ones of the custom tool alignments may be designated as required. Required alignments are similar to other alignments but include a designator. When an activating event is detected, e.g. a manipulation that includes the depressing of the shift key, all alignments that are designated as required are processed without regard for the search radius. Accordingly, a required alignment may be returned as a candidate alignment if the alignment matches the current cursor position without regard for the search radius. In one implementation, required alignments automatically have their respective priority assignment upgraded to a highest priority when required alignments are activated. In one implementation, each engine may include required alignments which may be activated.

Figure 6A:
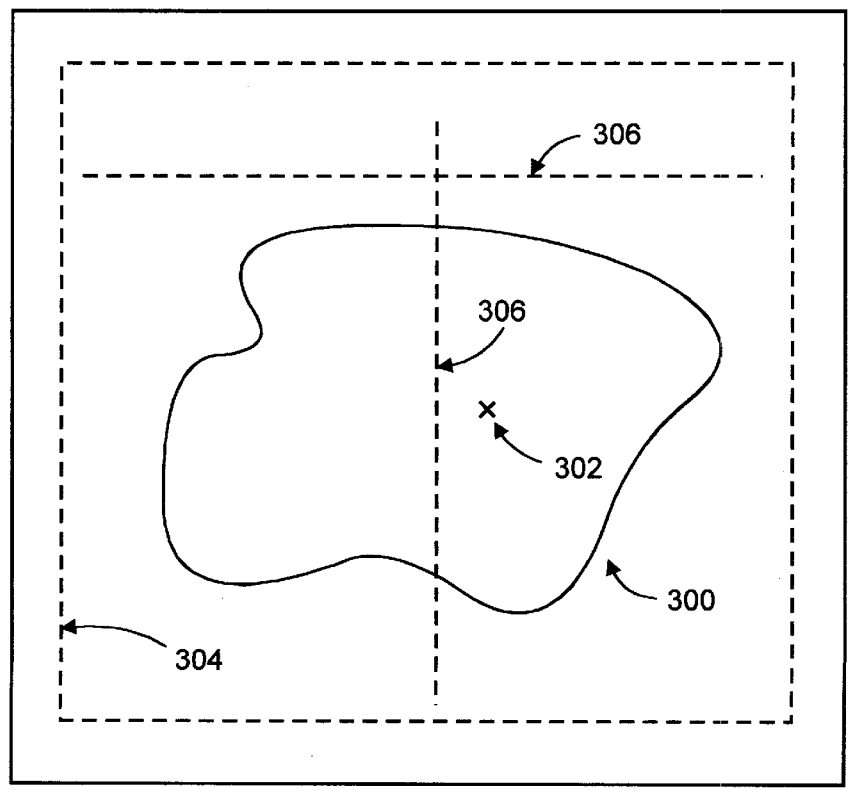
FIG. 6*a* shows object boundary alignments as displayed on an output device according to the invention.

Referring to FIG. 6a, object boundary alignments are used to snap the boundary of an object (specifically the object being manipulated by the current tool) to other elements of the document. Boundary engine 70 (FIG. 1a) determines a locus of cursor positions which would cause the object to be aligned to a document feature, such as a grid line. To compute the cursor positions, boundary engine 70 receives as inputs the objects 300 being transformed, the kind of transformation being performed (e.g., translate, scale, rotate, etc.), the search radius and the current cursor location 302. The boundary engine evaluates the inputs to determine to which element a designated boundary of the object may be snapped. Optionally, the possible elements to which a boundary may snap may be limited to page boundaries 304 and grid lines 306. These restrictions simplify the algorithm needed to compute the locus of cursor positions and allow the locus to be described as a set of line segments. The boundary engine produces as an output a list of all possible alignments to the boundary of the selected object which are described by an alignment point (or curve) for the proposed alignment.

The boundary constraint engine determines the locus of cursor positions which would cause some point on the boundary of one or more objects to be aligned with some other element of the document. The resulting locus of cursor positions is returned to the alignment processor as the set of possible boundary alignments. In order perform this function, three pieces of information are necessary: the description of the boundary of the object(s), the description of the possible document elements to which the object(s) may be aligned and information as to how a change in the cursor position affects the position of the object boundary.

The object(s) of interest is the object which is being manipulated by the current tool. In most graphical applications, the object(s) is the currently selected objects (s). The boundary engine obtains information about the object by querying the application for the currently selected object(s).

The possible document elements to which the object(s) may be aligned are grid lines, page boundaries, construction lines, or other objects in the document. Description information may be supplied to the boundary engine from the another constraint engine. The boundary engine queries ones of the constraint engines for their alignments. For example, the construction line engine creates and maintains construction lines in the application. The boundary engine may retrieve the list of possible construction line candidates for alignment directly from the construction line engine.

In addition to the description of the object and candidate objects in the document to which an object may align, the boundary engine is required to understand how a change in the cursor position affects the position of the object boundary. For example, in the case of the move tool, an (x, y) offset in the cursor position results in a corresponding (x, y) offset of the object boundary.

The solution for determining boundary alignments in general is computationally intensive. In one implementation, restrictions are imposed to simplify the determination process.

More specifically, in one implementation, the elements to which object boundaries may be aligned must be defined by straight lines. Accordingly, page boundaries, grid lines and construction lines as possible candidates but arbitrary document objects are not considered. Boundary snapping may only be implemented for the move tool. This implies a particularly simple relationship between a change in cursor position and the change in the object boundary. Specifically, moving the cursor by an increment (dx, dy) moves every point on the object boundary by the same increment.

Figure 6B:
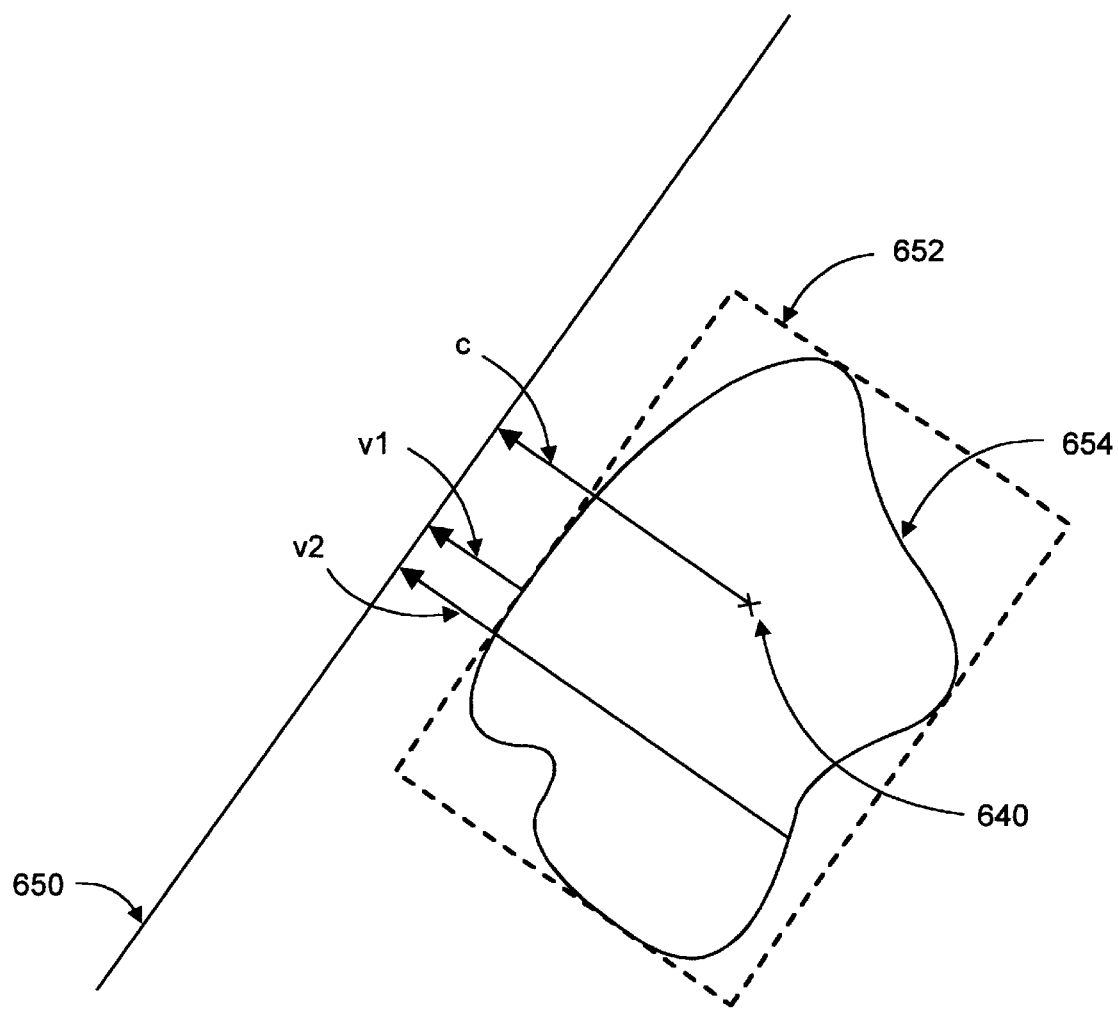
FIG. 6*b* shows the relationships between an object, the object boundary and an object to which the boundary of the object is to be aligned according to the invention.

With these restrictions, the boundary engine may compute the locus of cursor position 640 according to the following process as described in reference to FIG. 6b. For each possible alignment, the angle of the line 650 with respect to the x,y axes is determined. A bounding box 652 of the selected objects 654 with respect to a coordinate system rotated according to the angle of line 650 is determined. Thereafter, the two vectors v1 and v2, orthogonal to line 650, which would align bounding box 652 of the object with line 650 are determined. The vector, c, orthogonal to line 650 from current cursor position 640 to line 650 is determined. The locus of cursor positions which would align the object boundary is then defined by the two lines which result from translating the original line by the vectors (v1−c) and (v2−c).

Constraint system and the alignment processor enable required and optional constraints to be resolved simultaneously, and multiple alignments may be provided. For example, a required alignment to a custom tool line (generated when a transformation is invoked in conjunction with holding down the shift key to snap to, for example, a multiple of 45 degrees) and an object alignment may be able to be supported simultaneously. The boundary engine and other constraint engines operate in parallel and may support snapping to both object boundaries and, for example, construction lines simultaneously. Both may be resolved simultaneously, independent of where the cursor is located within the object boundaries and/or the page of the electronic document.

Figure 7A:
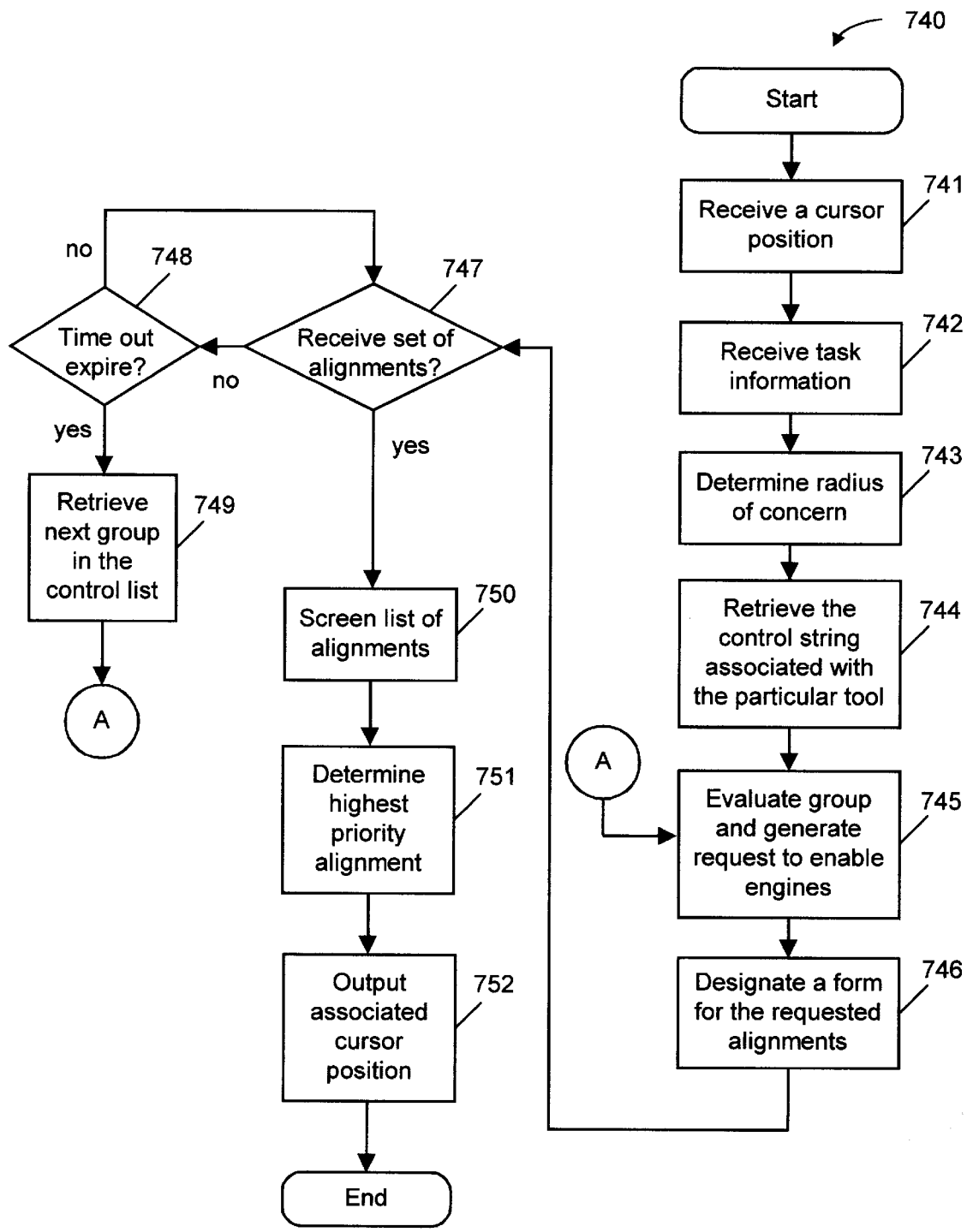
FIG. 7*a* is a flow diagram of a process for aligning an object according to the invention.

Referring to FIG. 7a, a process 740 by which the alignment processor of the smart guides engine determines an aligned cursor position is described. As the user manipulates an object, the alignment processor of the smart guides engine receives a cursor position (step 741) and task information (step 742) from the application. Typically, the cursor position is provided in the form of an (x,y) coordinate relative to the position of the object in the electronic document. Task information describes what type of task is being performed, such as translation, scaling or rotation.

After receiving the cursor position and task information from the application, the alignment processor determines a "radius of concern" (743) and retrieves the control string associated with the particular tool being invoked (744). The alignment processor evaluates the first group in the string and requests engines in the constraint system corresponding to those indicated in the first group be enabled (step 745) and designates a form for candidate alignments as either "point" alignments or "edge" alignments (746). The set of alignments returned by the constraint system consists of a sequence of pairs of the form (address, point) or (address, curve) depending on whether point or edge alignment was requested, including address information about the candidate alignment.

The alignment processor waits until a set of alignments is returned from the constraint system (747). If no alignments are returned within a predetermined timeout (748), then the alignment processor enables a next group of constraint engines as indicated by the next group entry in the control string (749). Thereafter the process continues at step 745.

If a set of alignments is returned from the constraint, the alignment processor screens the list of alignments received in an attempt to resolve multiple candidate alignments simultaneously (step 750).

In one implementation, candidate alignments are screened to determine if multiple alignments may be satisfied. If two alignments may be concurrently satisfied, then a new candidate alignment is formed indicating both alignments. In one implementation, the new candidate alignment is assigned a priority level that is equal to the highest setting for either of the two individual candidate alignments. Alternatively, a higher priority level may be attributed to the new candidate alignment so as to encourage achieving multiple alignments.

Screening step 750 may include an evaluation to determine if an individual alignment satisfies a minimum alignment priority. A minimum priority level may be selected by a user or a default value may be employed. In one implementation, a minimum priority value of 0 indicates that any new position is acceptable while higher values indicate that only alignments that satisfy the minimum threshold will be invoked. If a minimum priority option is included, the alignment processor checks if the priority level associated with each candidate alignment meets the minimum priority. If no alignment meets the minimum priority, the smart guides engine outputs the original cursor position unchanged. Alignments that fail to meet the minimum priority requirement may be discarded or otherwise not considered in the further processing by the alignment processor.

The alignment processor then determines which alignment or set of alignments has the highest priority (step 751). If more than one alignment has the same priority, then the alignment processor selects an alignment that is closer to the current cursor position as the highest priority selection. Once the highest priority alignment, or set of alignments is determined, the alignment processor outputs the associated cursor position as the new cursor position (step 752). The new (x,y) coordinate will have the maximum possible priority, satisfy as many alignments as possible and be the minimum distance from the input position. If no such position exists, the input position is returned unmodified, resulting in no snapping of the cursor during this particular manipulation of the current tool. Thereafter, the process ends.

Optionally, the output of the smart guides engine may include annotations. An annotation may be provided along with a new cursor position and displayed in proximity to the object. Thus, when a new (x,y) coordinate is returned, the name of the alignment used or the object to which the object is aligned may be displayed so that the user receives feedback as to the results of the automatic alignment function.

Figure 7B:
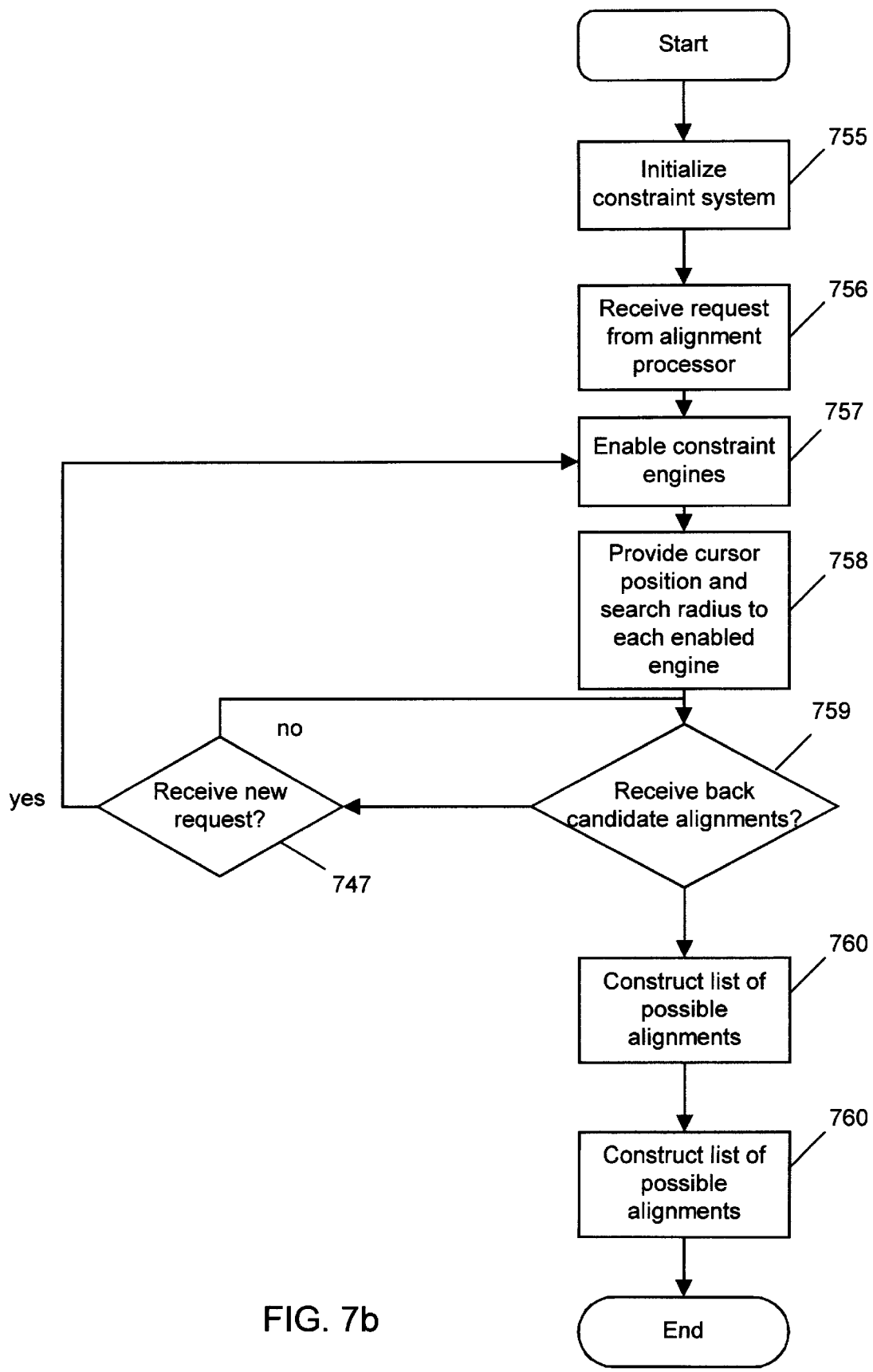
FIG. 7*b* is a flow diagram of a process executed by the constraint system according to the invention.

A flow diagram associated with the operation of the constraint system is shown in FIG. 7b. The constraint system is initialized (755) and then waits until receipt of a request from the alignment processor (756). Upon receipt of a request, the constraint system enables ones of the constraint system engines as indicated by the request (757).

Engines in the constraint system are enabled based on the group information in the control string. Enabling an engine makes the alignments it defines possible candidates for aligning the cursor position. The alignment processor enables a constraint engine by requesting the constraint system to enable the given engine.

Each enabled engine is provided with cursor position information, search radius information and other information as required and determines all possible alignments of a given type (step 758). A check is performed at each engine to determine if the current cursor position satisfies an alignment. An alignment is satisfied if the (x,y) position for the object is no further than the search radius from one of the points (curves) associated with an alignment. Alternatively, more complex criteria for determining candidate alignments may be provided such as required alignments or boundary alignments as described above. In one implementation, engines that are enabled based on a request received from the constraint system remain enabled the entire time a particular control string is active. In one implementation, the engines are disabled and particular ones re-enabled each time the alignment processor receives a new current cursor position.

The constraint system receives candidate alignments from engines 70–82 (FIG. a) (759) and constructs a list of possible alignments (step 760). Each alignment includes type information and a set of points representing a location which will produce alignment for the object of the type indicated. In practice, this set of points is defined either as a single (x,y) coordinate or as a curve. A curve may be a series of cubic Bezier segments. The list may be prioritized based on the radius information specified by the alignment processor.

The constraint system outputs the list to the alignment processor (761). If no candidate alignments are received from the enabled engines, the constraint system checks to see if a new set of alignment criteria has been received from the alignment processor (based on the processing of a new group in the control string). If a new set of alignment criteria has been received, then the process is continued at step 757. Otherwise process returns to step 759.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. The programmable computer may be part of a printer or display which executes the methods disclosed herein to produce a graphical pattern disposed on a visual or hard copy display connected to (or at) the output device.

Figure 8:
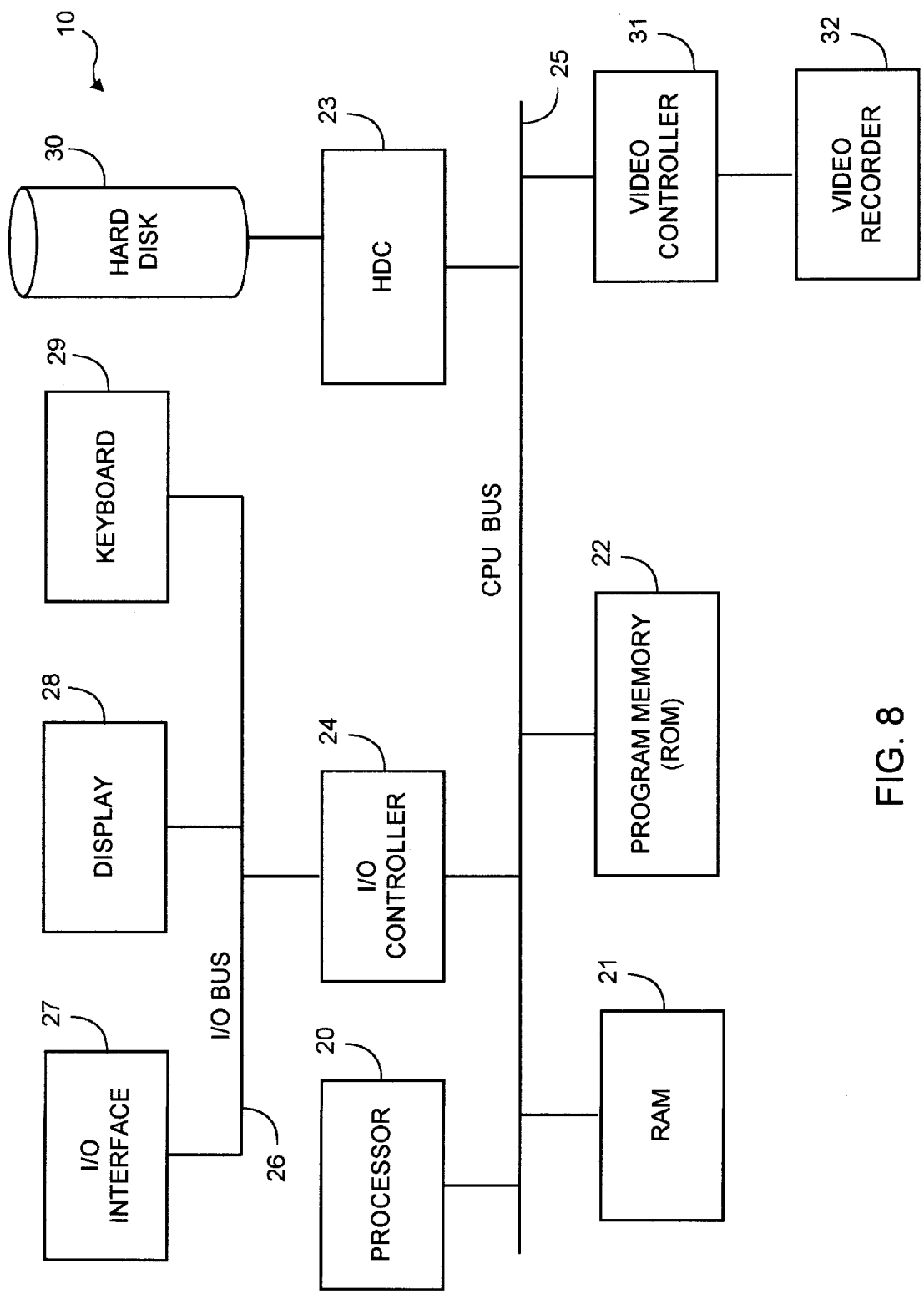
FIG. 8 is a block diagram of an exemplary computer system for automatically snapping an object in accordance with the invention.

By way of example, FIG. 8 shows a block diagram of a programmable information processing system (computer) 10. Computer 10 preferably includes a processor 20, random access memory (RAM) 21, a program memory 22 (preferably a writable read-only memory (ROM) such as a flash ROM) and an input/output (I/O) controller 24 coupled by a CPU bus 25. Computer 10 may optionally include a hard drive controller 23 which is coupled to a hard disk 30 and CPU bus 25. Hard disk 30 may be used for storing application programs, including programs incorporating the present invention, and data. Programs may also be stored in RAM or ROM.

I/O controller 24 is coupled by means of an I/O bus 26 to an I/O interface 27. I/O interface 27 receives and transmits data in analog or digital form over communication links such as a serial link, local area network, wireless link, and parallel link. Optionally, a display 28, a keyboard 29 and a pointing device (such as a mouse) 31 may also be connected to I/O bus 26. Alternatively, separate connections (separate buses) may be used for I/O interface 27, display 28, keyboard 29 and pointing device 31. Computer 10 may be preprogrammed or it may be programmed (and reprogrammed) from another source (e.g., a floppy disk, CD-ROM, or another computer).

Each computer program is tangibly stored in a machine-readable storage medium or device (e.g., program memory 22 or magnetic disk) readable by a general or special purpose programmable computer, for configuring and controlling operation of a computer when the storage media or device is read by the computer to perform the processes described herein. The invention may also be considered to be embodied in a computer-readable storage medium, configured with a computer program, where the storage medium so configured causes a computer to operate in a specific and predefined manner to perform the functions described herein.

The present invention has been described in terms of specific embodiments, which are illustrative of the invention and not to be construed as limiting. Other embodiments are within the scope of the following claims.

What is claimed is:

1. A computer-implemented method for aligning objects, the method comprising:

receiving a current cursor position;

receiving task information;

receiving a set of alignments each having an associated priority;

screening the set of alignments based on the task information and a predetermined set of priority factors;

determining a highest priority alignment; and outputting a new cursor position corresponding to the highest priority alignment if such an alignment exists.

2. The method of claim 1, wherein the set of alignments includes at least one of the following: boundary alignments, required alignments, custom tool alignments, construction lines, grid lines, page boundaries and graphical objects.

3. The method of claim 1, further comprising:

determining a minimum priority; and eliminating alignments having a priority less than the minimum priority during the screening of the set of alignments.

4. The method of claim 1, wherein the outputting of a new cursor position includes an annotation describing the highest priority alignment.

5. A system for aligning an object, the system comprising:

a computer system for executing computer code to produce and displaying an electronic document having a an object therein;

a display device for displaying the electronic document; and a computer readable storage medium for storing the computer code, the computer code including computer instructions for receiving a current cursor position;

computer instructions for receiving task information;

computer instructions for receiving a set of alignments each having an associated priority;

computer instructions for screening the set of alignments based on the task information and a predetermined set of priority factors;

computer instructions for determining a highest priority alignment; and computer instructions for outputting a new cursor position corresponding to the highest priority alignment if such an alignment exists.

6. The system of claim 5, wherein the set of alignments includes at least one of the following: boundary alignments, required alignments, custom tool alignments, construction lines, grid lines, page boundaries and graphical objects.

7. The system of claim 5, further comprising:

computer instructions for determining a minimum priority; and computer instruction for eliminating alignments having a priority less than the minimum priority during the screening of the set of alignments.

8. The system of claim 5, wherein the computer instructions for outputting a new cursor position includes computer instructions for outputting an annotation describing the highest priority alignment.

9. A computer readable medium containing program instructions for aligning an object, the computer readable medium comprising:

computer readable code devices for receiving a current cursor position;

computer readable code devices for receiving task information;

computer readable code devices for receiving a set of alignments each having an associated priority;

computer readable code devices for screening the set of alignments based on the task information and a predetermined set of priority factors;

computer readable code devices for determining a highest priority alignment; and computer readable code devices for outputting a new cursor position corresponding to the highest priority alignment if such an alignment exists.

10. The computer readable medium of claim 9, wherein the set of alignments includes at least one of the following: boundary alignments, required alignments, custom tool alignments, construction lines, grid lines, page boundaries and graphical objects.

11. The computer readable medium of claim 9, further comprising:

computer readable code devices for determining a minimum priority; and computer readable code devices for eliminating alignments having a priority less than the minimum priority during the screening of the set of alignments.

12. The computer readable medium of claim 9, wherein the computer readable code devices for outputting a new cursor position includes computer readable code devices for outputting an annotation describing the highest priority alignment.

* * * * *